United States Patent
Tang et al.

(10) Patent No.: US 10,519,268 B2
(45) Date of Patent: Dec. 31, 2019

(54) COMPOSITE POLYURETHANE FOAM COMPRISING GRAPHENE, PROCESSES FOR PREPARING THE SAME USE THEREOF

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); Wenjie Peng, Shandong (CN); Shuangcheng Wang, Shandong (CN); Ding Liu, Shandong (CN)

(73) Assignee: JINAN SHENGQUAN GROUP SHARE HOLDING CO., LTD., Shandong (CN)

( * ) Notice: Subject to any disclaimer, the term of this patent is extended or adjusted under 35 U.S.C. 154(b) by 0 days.

(21) Appl. No.: 15/522,448

(22) PCT Filed: Aug. 3, 2016

(86) PCT No.: PCT/CN2016/093114
§ 371 (c)(1),
(2) Date: Apr. 27, 2017

(87) PCT Pub. No.: WO2017/071359
PCT Pub. Date: May 4, 2017

(65) Prior Publication Data
US 2019/0153145 A1     May 23, 2019

(30) Foreign Application Priority Data

| Oct. 27, 2015 | (CN) | 2015 1 0708956 |
| Oct. 27, 2015 | (CN) | 2015 1 0712333 |
| Nov. 27, 2015 | (CN) | 2015 1 0854177 |

(51) Int. Cl.

| B29C 44/42 | (2006.01) |
| C08G 18/08 | (2006.01) |
| C08G 18/18 | (2006.01) |
| C08G 18/20 | (2006.01) |
| C08G 18/22 | (2006.01) |
| C08G 18/24 | (2006.01) |
| C08G 18/48 | (2006.01) |
| C08G 18/76 | (2006.01) |
| C08J 9/00 | (2006.01) |
| C08J 9/12 | (2006.01) |
| C08K 3/02 | (2006.01) |
| C08K 3/04 | (2006.01) |
| C08K 3/08 | (2006.01) |
| C08L 75/04 | (2006.01) |
| C08G 101/00 | (2006.01) |

(52) U.S. Cl.
CPC ......... *C08G 18/14* (2013.01); *C08G 18/1816* (2013.01); *C08G 18/1825* (2013.01); *C08G 18/2081* (2013.01); *C08G 18/244* (2013.01); *C08G 18/48* (2013.01); *C08G 18/7621* (2013.01); *C08K 3/042* (2017.05); *C08K 3/08* (2013.01); *C08G 2101/00* (2013.01); *C08G 2101/0008* (2013.01); *C08G 2101/0025* (2013.01); *C08J 2205/10* (2013.01); *C08J 2375/04* (2013.01); *C08K 2003/023* (2013.01); *C08K 2003/0812* (2013.01); *C08K 2003/0856* (2013.01); *C08K 2201/011* (2013.01)

(58) Field of Classification Search
CPC .. C08G 18/0838; C08G 18/14; C08G 18/244; C08G 18/1816; C08G 18/1825; C08G 18/7621; C08G 2101/0025; C08J 9/0014; C08J 2205/10; C08J 2375/05; C08K 3/08; C08K 2003/023; C08K 2003/0812; C08K 2003/0856
See application file for complete search history.

(56) References Cited

U.S. PATENT DOCUMENTS

| 2009/0136413 A1 | 5/2009 | Li et al. |
| 2012/0244333 A1 | 9/2012 | Aksay et al. |
| 2018/0273387 A1* | 9/2018 | Tang ..................... B82Y 30/00 |

FOREIGN PATENT DOCUMENTS

| CN | 1308148 A | 8/2001 |
| CN | 101671857 A | 3/2010 |
| CN | 202088605 U | 12/2011 |
| CN | 102330173 A | 1/2012 |
| CN | 102491308 A | 6/2012 |
| CN | 103044865 A | 4/2013 |
| CN | 103088460 A | 5/2013 |

(Continued)

OTHER PUBLICATIONS

Machine Translation for CN105504341 obtained from European Patent Office Mar. 2019.*

(Continued)

*Primary Examiner* — Melissa A Rioja
(74) *Attorney, Agent, or Firm* — Faegre Baker Daniels LLP (57) ABSTRACT

The present invention relates to a polyurethane foam comprising graphene, wherein the polyurethane foam comprises graphene structure and a non-carbon non-oxygen non-hydrogen element. By choosing a specific composite having a carbon nanostructure, the present invention achieves compounding polyurethane via simply mixing with polyether polyol, and then polymerizing with polyisocyanate, omitting the step of compounding the composite having a carbon nanostructure, having a simple process and seamlessly connecting with existing equipment.

16 Claims, 1 Drawing Sheet

(56) References Cited

FOREIGN PATENT DOCUMENTS

| | | | |
|---|---|---|---|
| CN | 103408718 A | 11/2013 |
| CN | 103508444 A | 1/2014 |
| CN | 103710790 A | 4/2014 |
| CN | 103814080 A | 5/2014 |
| CN | 103898782 A | 7/2014 |
| CN | 103938293 A | 7/2014 |
| CN | 104016341 A | 9/2014 |
| CN | 104118874 A | 10/2014 |
| CN | 104164707 A | 11/2014 |
| CN | 104328523 A | 2/2015 |
| CN | 104386684 A | 3/2015 |
| CN | 104711705 A | 6/2015 |
| CN | 104724699 A | 6/2015 |
| CN | 104755545 A | 7/2015 |
| CN | 104804204 A | 7/2015 |
| CN | 104831389 A | 8/2015 |
| CN | 104844781 A | 8/2015 |
| CN | 104892886 A | 9/2015 |
| CN | 105153396 | * | 12/2015 |
| CN | 105504199 A | 4/2016 |
| CN | 105504341 A | 4/2016 |
| CN | 105504696 A | 4/2016 |
| CN | 105504700 A | 4/2016 |
| CN | 105504785 A | 4/2016 |
| CN | 105506771 A | 4/2016 |
| CN | 105524246 | * | 4/2016 |
| CN | 105524452 A | 4/2016 |
| CN | 105525381 A | 4/2016 |
| EP | 2871207 A1 | 5/2015 |
| EP | 2921068 A1 | 9/2015 |
| JP | 2011522920 A | 8/2011 |
| JP | 2015105441 A | 6/2015 |
| WO | 2017024933 A1 | 2/2017 |
| WO | 2017071359 A1 | 5/2017 |
| WO | 2017071360 A1 | 5/2017 |
| WO | 2017084621 A1 | 5/2017 |

OTHER PUBLICATIONS

English-language abstract for CN105504341 obtained from European Patent Office Mar. 2019.*
Machine Translation for CN105153396 obtained from European Patent Office Mar. 2019.*
English-language abstract for CN105153396 obtained from European Patent Office Mar. 2019.*
Machine Translation for CN105524246 btained from European Patent Office Mar. 2019.*
English-language abstract for CN105524246 obtained from European Patent Office Mar. 2019.*
International Search Report and Written Opinion issued in PCT/CN2016/093114 with English translation of ISR, dated Nov. 1, 2016, 13 pages.
International Search Report and Written Opinion issued in PCT/CN2016/093116 with English Translation of ISR, dated Oct. 19, 2016, 14 pages.
Extended European Search Report issued in EP Application No. 16854589.5, completed May 11, 2018, 6 pages.

* cited by examiner

COMPOSITE POLYURETHANE FOAM COMPRISING GRAPHENE, PROCESSES FOR PREPARING THE SAME USE THEREOF

CROSS-REFERENCE TO RELATED APPLICATION

This application is a national phase application of PCT Application No. PCT/CN2016/093114, internationally filed Aug. 3, 2016, which claims priority to Chinese Application 201510708956.1, filed Oct. 27, 2015; Chinese Application 201510712333.1, filed Oct. 27, 2015; and Chinese Application 201510854177.2, filed Nov. 27, 2015, all of which are herein incorporated by reference in their entirety.

TECHNICAL FIELD

The present invention belongs to the field of macromolecular materials, specifically relates to a composite polyurethane foam comprising graphene, processes for preparing the same, and use thereof. The composite polyurethane foam comprising graphene has far-infrared function, and can be used for preparing pillow, mattress, cushion, back cushion, sofa, waist support, insoles, bra, car seat, toilet seat, or hand warmer, emits far-infrared ray and has healthcare function.

BACKGROUND

Polyurethane known as polyurethane is a general term of macromolecular compounds in which the main chain contains repeated carbamate groups, and is addition polymerized from organic diisocyanate or polyisocyanate with dihydroxy or polyhydroxy compounds.

CN104892886A discloses a low flue gas release rigid polyurethane foam and a process for preparing the same and a use thereof. The polyurethane foam is produced from a composition comprising a polyisocyanate, a polymer polyol, a chain extender, a catalyst, a flame retardant and a foaming agent. The polymer polyol comprises a polyether polyol which is chemically bonded to graphene, and the flame retardant is a compounded composition of an organic phosphorus flame retardant and an inorganic flame retardant. The rigid polyurethane foam not only has excellent flame retardant properties, but also has a lower flue gas release rate, and can greatly improve the survival rate of fire victims. But it needs to chemically bond graphene and polyol, and has harsh process conditions and complex pretreatment. Moreover, the materials prepared have no obvious far-infrared function.

CN202088605U discloses a memory polyurethane with far-infrared healthcare function, which comprises a refrigerating polyurethane layer, a warm-keeping polyurethane layer, a far-infrared healthcare layer, wherein the far-infrared healthcare layer is fixed on the refrigerating polyurethane layer; and the warm-keeping polyurethane layer is fixed on the far-infrared healthcare layer. The far-infrared healthcare layer is prepared from bamboo carbon fiber. The warm-keeping polyurethane layer is a memory foam. Far-infrared ray can be emitted to promote human blood circulation, play a role in health care, and is conducive to people's health.

CN104804204A discloses a graphene/thermoplastic polyurethane composite material, a process for preparing the same and a use thereof. The invention uses an improved Hummers method to prepare an oxidized graphene which is dispersed in DMF, ultrasonic treated, poured into TPU swelled in DMF. A GO/TPU composite material film is prepared by solution coating film-forming process, and treated by in-situ heat reduction for 2 h at 200° C. to prepare a graphene/thermoplastic polyurethane composite material. The prepared graphene/thermoplastic polyurethane composite material has excellent electrical performance and homogeneous filler dispersion, and can be used for preparing TPU medical mattress, TPU biogas storage bag, TPU wading product, TPU water-oil storage bag and so on, which fall within the fields having higher requirements on barrier property to materials and antistatic property.

The polyurethane foam is generally used for preparing pillow, mattress, cushion, back cushion, sofa, waist support, insoles, bra, car seat, toilet seat, hand warmer and the like. Use for a long time of these products will breed bacteria and dust mites. Pillows for three years will contain 10% of molds, mite feces and pervasive mite skeletons. According to medical data, 12%-16% of people have allergies, and 25% of these patients have allergies due to home dust mites. Up to 90% of asthmatic patients are caused by home dust mites. These show the extent of harm caused by the dust mites.

Therefore, how to develop a versatile polyurethane foam and its products has become a current focus of wide attention in the field and an urgent problem to be solved.

SUMMARY

On the basis of the aforesaid problems, the first object of the present invention is to provide a polyurethane foam comprising graphene structure, processes for preparing the same and a use thereof. The polyurethane foam and its products provided in the present invention not only have better far-infrared performance, but also can have better antibacterial and bacteriostatic properties.

A polyurethane foam comprising graphene structure is characterized in that the polyurethane foam comprises graphene structure and a non-carbon non-oxygen non-hydrogen element; the non-carbon non-oxygen non-hydrogen element comprises elements of Fe, Si and Al; the elements of Fe, Si and Al are in an amount of 0.0018 weight percent (wt %)-0.4 wt % of the polyurethane foam.

Preferably, the graphene structure and a substance containing the non-carbon non-oxygen non-hydrogen element are introduced in a form of a composite having a carbon nanostructure.

Preferably, the composite having a carbon nanostructure has a peak height ratio of the G peak to D peak of 1-20 in the Raman spectrum.

Preferably, the composite having a carbon nanostructure further has a 2D peak in the Raman spectrum.

Preferably, the composite having a carbon nanostructure comprises carbon element in an amount of 80 wt % or more.

The present invention chooses a specific composite having a carbon nanostructure as a composite raw material, and polymerizes the composite with polyisocyanate by conventional process for preparing polyurethanes after mixing with polyether polyol, without modifying the composite having a carbon nanostructure in advance. It is necessary to simply mix polyether polyol and the composite having a carbon nanostructure.

If each element is closely packed, or adsorbed and combined closely with carbon atoms in the composite having a carbon nanostructure, it is beneficial to its dispersion in the process of synthesizing polyurethane, making the far-infrared effect and antibacterial effect more excellent. If the adsorption intensity of each element with carbon atoms is not good in the composite having a carbon nanostructure, e.g. the compound of carbon materials having graphene structure and metal elements being obtained by physical mixing, it will bring adverse effects to the far-infrared effect and antibacterial effect.

Preferably, the composite having a carbon nanostructure in the composite polyurethane foam is in an amount of 0.1 wt %-10 wt % of polyether polyol material of the composite polyurethane foam.

Preferably, the composite having a carbon nanostructure has a far-infrared detection normal emissivity of greater than 0.85.

Preferably, the non-carbon non-oxygen non-hydrogen element further comprises any one selected from the group consisting of P, Ca and Na, or a combination of at least two selected therefrom.

Preferably, the non-carbon non-oxygen non-hydrogen element further comprises any one selected from the group consisting of Ni, Mn, K, Mg, Cr, S or Co, or a combination of at least two selected therefrom.

Preferably, the other non-carbon non-oxygen non-hydrogen element than elements of Fe, Si and Al is in an amount of 0.5 wt % or less of the polyurethane foam.

Preferably, the elements of Fe, Si and Al are in an amount of 0.01 wt %-0.4 wt % of the polyurethane foam.

Preferably, the graphene structure is introduced in a form of biomass graphene prepared by using biomass as raw material.

Preferably, the graphene structure has a thickness of less than or equal to 100 nanometers (nm).

Preferably, the composite having a carbon nanostructure has a carbon six-membered ring honeycomb lamellar structure having a thickness of 100 nm or less, preferably of 20 nm or less, further preferably is any one selected from the group consisting of carbon six-membered ring honeycomb lamellar structures having 1-10 layers, or a combination of at least two selected therefrom, preferably any one of structures having single layer, double layers, and 3-10 layers, or a combination of at least two selected therefrom.

Preferably, the carbon six-membered ring honeycomb lamellar structure in the composite microscopically shows any one conformation selected from the group consisting of warping, curling and folding, or a combination of at least two selected therefrom.

Preferably, the composite having a carbon nanostructure comprises graphene structure and amorphous carbon.

Preferably, the non-carbon non-hydrogen non-oxygen element is adsorbed on the surface of or inside the carbon nanostructure in any one form selected from the group consisting of simple substance, oxides and carbides, or a combination of more selected therefrom.

Preferably, the graphene structure is introduced in a form of biomass graphene prepared by using biomass as raw material.

Preferably, the biomass is one or more selected from the group consisting of lignose, cellulose prepared from trees, straws and other agricultural and forestry wastes, and mixtures thereof.

The second object of the present invention is to provide a process for preparing the polyurethane foam in the first object, comprising the steps of introducing a substance containing graphene structure and non-carbon non-oxygen non-hydrogen element into polyether polyol to prepare a polyurethane foam comprising a carbon nanostructure.

The third object of the present invention is to provide a process for preparing the polyurethane foam in the first object, comprising the steps of:

(1) adding into polyether polyol a composite having a carbon nanostructure, an emulsifier, a first catalyst, and a foaming agent, stirring and mixing homogeneously to obtain a polyether polyol monomer composition;

(2) adding polyisocyanate into the polyether polyol monomer composition of step (1) and mixing homogeneously;

(3) pouring the mixture in step (2) into a mold for foaming and curing to obtain a composite polyurethane foam comprising a carbon nanostructure;

optionally, further adding a functional auxiliary before obtaining the polyether polyol monomer composition in step (1), preferably a cell-opening agent, a chain extender, a flame retardant, a flavoring enhancer, or a plant extract, or a combination of at least two selected therefrom.

Preferably, the composite having a carbon nanostructure in step (1) is added in an amount of 0.1-10 parts by weight, preferably 1-6 parts by weight and 1.5-4 parts by weight.

Preferably, the composite having a carbon nanostructure is prepared by the following method:

(i) mixing a biomass carbon source and a second catalyst, stirring and catalyzing, drying to obtain a precursor;

(ii) maintaining the temperature of the precursor under protective atmosphere at 280-350° C. for 1.5 h-2.5 h, then heating by temperature programming to 950-1200° C. at a rate of 15-20° C./min, maintaining the temperature for 3 h-4 h to obtain a crude product;

(iii) washing the crude product to obtain a composite having a carbon nanostructure.

Preferably, the biomass carbon source and second catalyst have a mass ratio of 1:(0.1-10), preferably 1:(0.5-5), further preferably 1:(1-3).

Preferably, the second catalyst is any one selected from the group consisting of manganese compounds, iron-containing compounds, cobalt-containing compounds, and nickel-containing compounds, or a combination of at least two selected therefrom; the iron-containing compound is any one selected from the group consisting of halogen compounds of iron, iron cyanides and iron-containing salts of acid, or a combination of at least two selected therefrom; the cobalt-containing compound is any one selected from the group consisting of halogen compounds of cobalt and cobalt-containing salts of acid, or a combination of at least two selected therefrom; the nickel-containing compound is any one selected from the group consisting of nickel chlorides and nickel-containing salts of acid, or a combination of at least two selected therefrom.

Further preferably, the second catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

Preferably, the stirring and catalyzing treatment is carried out at 150° C.-200° C. for 4 h or more, preferably 4 h-14 h; the precursor contains water in an amount of, preferably, 10 wt % or less; the precursor in step (ii) is heated to 280-350° C. at a rate of, preferably, 3-5° C./min; the protective atmosphere is any one selected from the group consisting of nitrogen, helium and argon, or a combination of at least two selected therefrom, preferably nitrogen; the crude product in step (iii) is washed by acid washing and water washing in sequence; the acid washing is carried out by using hydrochloric acid having a concentration of 3 wt %-6 wt %, further preferably 5 wt %; the water washing is carried out by using deionized water and/or distilled water; the washing is carried out at 55-65° C., preferably 60° C.

Preferably, the biomass carbon source is cellulose and/or lignose, preferably cellulose, further preferably porous cellulose.

Preferably, the porous cellulose is obtained by the following method of:

acid hydrolyzing a biomass source to obtain lignocellulose, then porous post-processing to obtain porous cellulose; optionally, porous cellulose is used after bleaching; the biomass carbon source is selected from the group consisting of plants and/or agricultural and forestry wastes, or a combination of at least two selected therefrom, preferably any one selected from agricultural and forestry wastes, or a combination of at least two selected therefrom; the agricultural and forestry wastes are preferably selected from the group consisting of corn stalks, corn cobs, sorghum stalks, beet residues, bagasse, furfural residues, xylose residues, wood chips, cotton stalks, and reeds, or a combination of at least two selected therefrom, preferably corn cobs.

Preferably, the polyether polyol has a hydroxyl value of 20-300 mg KOH/g.

Preferably, the polyether polyol is a mixture of polyether having a hydroxyl value of 20-60 mg KOH/g and polyether having a hydroxyl value of 150-300 mg KOH/g; preferably, the polyether having a hydroxyl value of 20-60 mg KOH/g and polyether having a hydroxyl value of 150-300 mg KOH/g in the mixture are mixed in a mass ratio of 1:(0.1-10).

Preferably, the polyether polyol is any one selected from the group consisting of diol polyether, triol polyether, trimethylolpropane polyether and terminal hydroxyl polytetrahydrofuran ether, or a combination of at least two selected therefrom.

Preferably, the polyisocyanate is anyone selected from the group consisting of toluene diisocyanate, diphenylmethane diisocyanate, modified diphenylmethane diisocyanate and polymethylene polyphenyl polyisocyanate, or a combination of at least two selected therefrom.

Preferably, the emulsifier is any one selected from the group consisting of surfactants, or a combination of at least two selected therefrom, preferably silicone oil emulsifier, further preferably any one selected from the group consisting of methyl silicone oil, ethyl silicone oil, phenyl silicone oil, methyl hydrogen silicone oil, methyl phenyl silicone oil, methyl chlorophenyl silicone oil, methyl ethoxy silicone oil, methyltrifluoropropyl silicone oil, methylvinyl silicone oil, methyl hydroxyl silicone oil, ethyl hydrogen silicone oil, hydroxyl hydrogen silicone oil, cyanide-containing silicone oil, or a combination of at least two selected therefrom.

Preferably, the foaming agent is any one selected from the group consisting of chemical foaming agent or physical foaming agent, preferably is any one selected from the group consisting of $CO_2$, water, isobutane, cyclopentane, n-pentane, isopentane, dichloromethane, freon, or a combination of at least two selected therefrom; the foaming agent is preferably added in an amount of 0.1-20 parts by weight, further preferably from 1-10 parts by weight.

Preferably, the cell-opening agent is polyoxypropyleneethylene oxide copolyether and/or polyoxyalkylene-polysiloxane copolymer; the cell-opening agent is added in an amount of 0.1-10 parts by weight, further preferably 0.5-5 parts by weight.

Preferably, the chain extender is any one selected from the group consisting of ethylene glycol, propylene glycol, butylene glycol, diethylene glycol, glycerol, polyethylene glycol, diethylene glycol, or a combination of at least two selected therefrom, preferably glycerol; the chain extender is added in an amount of, preferably, 0.1-10 parts by weight, further preferably 0.5-5 parts by weight.

Preferably, the flame retardant is added in an amount of, preferably, 1-20 parts by weight, further preferably 5-15 parts by weight.

Preferably, the flavoring enhancer is added in an amount of, preferably, 0.1-5 parts by weight, further preferably 0.5-3 parts by weight.

Preferably, the first catalyst is any one selected from the group consisting of tertiary amine catalysts and/or metal salt catalysts, or a combination of at least two selected therefrom; the tertiary amine catalysts are any one selected from the group consisting of triethylenediamine, triethylamine, cyclohexylamine and diethanolamine, or a combination of at least two selected therefrom; the metal salt catalysts are any one selected from the group consisting of potassium acetate, potassium isooctanoate, potassium oleate, stannous octoate and dibutyltin dilaurate, or a combination of at least two selected therefrom.

Preferably, the curing temperature in step (3) ranges from 20° C. to 60° C., the curing lasts for 10-20 min.

Preferably, the raw materials used in the process comprise the following components, in parts by weight:

| | |
|---|---|
| polyether polyol | 100 parts |
| polyisocyanate | 25-100 parts |
| composite having a carbon nanostructure | 0.1-10 parts |
| first catalyst | 0.1-4 parts |
| emulsifier | 0.1-5 parts |
| foaming agent | 0.1-20 parts. | preferably, the raw materials used in the process comprise the following components, in parts by weight:

| | |
|---|---|
| polyether polyol | 100 parts |
| polyisocyanate | 40-55 parts |
| composite having a carbon nanostructure | 1-6 parts |
| first catalyst | 0.5-3 parts |
| emulsifier | 0.5-2 parts |
| foaming agent | 1-10 parts. | preferably, the raw materials used in the process comprise the following components, in parts by weight:

| | |
|---|---|
| polyether polyol | 100 parts |
| polyisocyanate | 47-52 parts |
| composite having a carbon nanostructure | 1.5-4 parts |
| first catalyst | 0.5-1.5 parts |
| emulsifier | 0.5-1.5 parts |
| foaming agent | 1-5 parts. |

The third object of the present invention is to provide a polyurethane foam product comprising the polyurethane foam of the first object. The product comprises pillow, mattress, cushion, back cushion, sofa, waist support, insoles, bra, car seat, toilet seat, or hand warmer.

As compared to the prior art, (1) by choosing a specific composite having a carbon nanostructure and comprising graphene, the present invention achieves compounding polyurethane via simply mixing with polyether polyol, and then polymerizing with polyisocyanate, without any need to modify graphene in the composite having a carbon nanostructure, omitting a step of modification, having a simple process and seamlessly connecting with existing equipment. (2) The polyurethane foam comprising graphene prepared according to the present invention has notable far-infrared performance and bacteriostatic property, wherein the far-infrared performance is excellent and reaches as high as 0.93; the bacteriostatic rate may be as high as 99%. It can be used to prepare pillow, mattress, cushion, back cushion, sofa, waist support, insoles, bra, car seat, toilet seat, or hand warmer, so as to obtain healthcare function.

DETAILED DESCRIPTION

In order to better understand the present application, preferred embodiments are described by combining with the following examples. It should be understood that these descriptions are just used for further explaining the features and advantages of the present invention, rather than any limits to the present invention.

The present invention does not specifically define the sources of all the raw materials, as long as they are commercially available or prepared according to conventional methods well known by those skilled in the art.

The present invention does not specifically define the purities of all the raw materials, and analytical purity is preferably used in the present invention.

The present invention provides a polyurethane foam comprising graphene structure, wherein the polyurethane foam comprises graphene structure and a non-carbon non-oxygen non-hydrogen element, and the non-carbon non-oxygen non-hydrogen element comprises elements of Fe, Si and Al in an amount of 0.0018 wt %-0.4 wt % of the polyurethane foam.

The elements of Fe, Si and Al in the present invention are further in an amount of 0.01 wt %-0.4 wt % of the polyurethane foam, further 0.02 wt %-0.4 wt %, more further 0.02 wt %-0.4 wt %, more further 0.1 wt %-0.3 wt %, e.g. 0.05 wt %, 0.1 wt %, 0.12 wt %, 0.13 wt %, 0.2 wt %, 0.23 wt %, 0.28 wt %, 0.38 wt % and the like. In the present invention, the mass percent of the elements of Fe, Si and Al of the polyurethane foam refers to the content of the elements of Fe, Si and Al in the polyurethane foam, i.e. the content of the elements in the mixture.

The present invention does not specifically define the graphene structure, as long as it is the well-known definition for those skilled in the art. The graphene structure of the present invention refers to a combination of many structures containing a single layer of graphene structure or multiple layers of graphene structure, more preferably a combination of a single layer of graphene and graphene having different layers. More preferably, the graphene structure of the present invention is any one of carbon six-membered ring honeycomb lamellar structures having 1-10 layers, or a combination of more selected therefrom, more preferably any one of structures having single layer, double layers, and 3-10 layers, or a combination of more selected therefrom.

Generally, carbon six-membered ring honeycomb lamellar structures having more than 10 layers and a thickness of 100 nm or less are called graphene nanosheets; carbon six-membered ring honeycomb lamellar structures having more than 10 layers and a thickness of 100 nm or less and prepared by using biomass as carbon source are called biomass graphene nanosheets; carbon six-membered ring honeycomb lamellar structures having 1-10 layers are called graphene; carbon six-membered ring honeycomb lamellar structures having 1-10 layers and prepared by using biomass as carbon source are called biomass graphene.

The carbon six-membered ring honeycomb lamellar structure in the graphene structure of the present invention microscopically shows any one conformation selected from the group consisting of warping, curling and folding, or a combination of more selected therefrom. The microstructure of the lamellar structure in the composite typically can be observed via electron microscope which may be transmission electron microscope or scanning electron microscope. The graphene structure of the present invention preferably has a thickness of 100 nm or less, more preferably 50 nm or less, and most preferably 20 nm or less.

In the polyurethane foam of the present invention, the non-carbon non-oxygen non-hydrogen element preferably further comprises one or more selected from the group consisting of P, Ca, Na, Ni, Mn, K, Mg, Cr, S and Co, more preferably more selected therefrom. The non-carbon non-oxygen non-hydrogen element exists in a form of simple substance and compounds, or a combination of more selected therefrom. In the preferred solution, the non-carbon non-oxygen non-hydrogen element is preferably in an amount of less than 0.5 wt % of the polyurethane foam, more preferably less than 0.4 wt %, more preferably less than 0.3 wt %, most preferably less than 0.2 wt %.

The present invention does not specifically define how the graphene structure and the substance containing the non-carbon non-oxygen non-hydrogen element are introduced into the polyurethane foam, as long as it is an introduction process well known by those skilled in the art. In order to improve the performances of the polyurethane foam, the graphene structure and the substance containing the non-carbon non-oxygen non-hydrogen element are introduced via a composite having a carbon nanostructure. The substance containing the non-carbon non-oxygen non-hydrogen element in the present invention is preferably nanoscale materials of the above elements, more preferably one or more selected from the group consisting of nanoscale simple substance, nanoscale oxides and nanoscale inorganic compounds.

The composite having a carbon nanostructure is in an amount of 0.1-10 wt % of the polyurethane foam, more preferably 1 wt %-8 wt %, most preferably 3 wt %-5 wt %. In the composite having a carbon nanostructure, the carbon content is preferably 80 wt % or more, more preferably 85 wt %-97 wt %, most preferably 90 wt %-95 wt %. The non-carbon non-oxygen non-hydrogen element is in an amount of 0.5 wt %-6 wt % of the composite having a carbon nanostructure, more preferably 1 wt %-5 wt %, most preferably 2 wt %-4 wt %. The composite having a carbon nanostructure has a peak height ratio of the G peak to D peak of 1-20, more preferably 3-20 in the Raman spectrum.

In the composite having a carbon nanostructure of the present invention, the graphene structure has a carbon six-membered ring honeycomb lamellar structure having a thickness of 100 nm or less, preferably of 20 nm or less, further preferably is any one selected from the group consisting of carbon six-membered ring honeycomb lamellar structures having 1-10 layers, or a combination of at least two selected therefrom, preferably any one of structures having single layer, double layers, and 3-10 layers, or a combination of at least two selected therefrom; preferably, the carbon six-membered ring honeycomb lamellar structure in the composite microscopically shows any one conformation selected from the group consisting of warping, curling and folding, or a combination of at least two selected therefrom.

The composite having a carbon nanostructure of the present invention preferably comprises graphene structure and amorphous carbon. The non-carbon non-oxygen non-hydrogen element is adsorbed on the surface of or inside the carbon nanostructure in any one form selected from the group consisting of simple substance, oxides and carbides, or a combination of more selected therefrom. The amorphous carbon comprises two-dimensional graphite layers or three-dimensional graphite crystallites, on the edge of which there are a large number of irregular bonds. Besides a large number of sp2 carbons, there are many sp3 carbons. In fact, their interior structures are crystals having the same structure as graphite, rather than real amorphous solid, besides that the layered structure formed by the hexagonal annular plane of carbon atoms is messy and irregular. There are defects in the formation of the crystal; the majority of amorphous carbon is formed by molecular debris having graphite layer structures which are roughly parallel to each other, and irregularly stacked together, referred to as chaotic layer structure. The layers or debris is connected by carbon atom bonds in the form of the tetrahedral bonding of diamond structure.

The composite having a carbon nanostructure of the present invention has a peak height ratio of the G peak to D peak of 1-20, e.g. 2, 5, 7, 8, 10, 12, 13, 16, 18 and the like in the Raman spectrum.

The composite having a carbon nanostructure further has a 2D peak in the Raman spectrum.

The G peak of carbon element in the Raman spectrum reflects sp2 hybridization degree; the D peak reflects the lattice imperfection, e.g. carbon structure of sp3.

The composite having a carbon nanostructure of the present invention is a composite primarily containing carbon and comprising impurity elements, wherein carbon element primarily exists in a form of sp2 hybrid form.

The composite having a carbon nanostructure of the present invention contains carbon element in an amount of 80 wt % or more, e.g. 82 wt %, 86 wt %, 89 wt %, 91 wt %, 94 wt %, 97 wt %, 99 wt % and the like, preferably 85-97 wt %, further preferably 90-95 wt %.

Preferably, the composite having a carbon nanostructure in the composite polyurethane foam is in an amount of 0.1-10 wt %, e.g. 0.2 wt %, 1 wt %, 3 wt %, 4 wt %, 6 wt %, 8 wt %, 9 wt % and the like, preferably 3-5 wt %, of the polyether polyol material of the composite polyurethane foam. The composite having a carbon nanostructure has a peak height ratio of the G peak to D peak of 2-20, preferably 3-20 in the Raman spectrum.

Preferably, the composite having a carbon nanostructure has a far-infrared detection normal emissivity of greater than 0.85, e.g. 0.87, 0.89, 0.91, 0.92, 0.93 and the like.

The present invention does not specifically define the process for preparing the composite having a carbon nanostructure of the present invention, as long as it is a process for preparing similar composites well known by those skilled in the art. The present invention preferably comprises the following steps of:

(1) catalyzing a biomass carbon source under the action of a catalyst to obtain a precursor;
(2) maintaining the temperature of the precursor at 140° C.-180° C. for 1.5 h-2.5 h under the condition of protective gas to obtain a first intermediate;
(3) heating the first intermediate to 350° C.-450° C. under the condition of protective gas and maintaining the temperature for 3 h-4 h to obtain a second intermediate;
(4) heating the second intermediate to 1100° C.-1300° C. under the condition of protective gas and maintaining the temperature for 2 h-4 h to obtain a third intermediate;
(5) alkali washing, acid washing and water washing the third intermediate in sequence to obtain a composite;
wherein the temperatures in steps (3) and (4) are increased at a rate of 14° C./min-18° C./min.

The carbon source is preferably biomass carbon source. The biomass carbon source is any one selected from the group consisting of plants and/or agricultural and forestry wastes, or a combination of at least two selected therefrom, preferably any one selected from coniferous wood, broadleaf wood, forest wood, agricultural and forestry wastes, or a combination of at least two selected therefrom. Preferably, the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs. The biomass carbon source is preferably lignocellulose, cellulose and/or lignose, more preferably cellulose and/or lignose, more preferably lignose, further preferably porous cellulose.

Preferably, the substance for introducing graphene structure is not activated or modified during the introduction of graphene structure in the preparation of the polyurethane foam.

The biomass carbon source and the catalyst have a mass ratio of 1:(0.1-10), preferably 1:(0.5-5), further preferably 1:(1-3). Preferably, the catalyst is any one selected from the group consisting of manganese compounds, iron-containing compounds, cobalt-containing compounds, and nickel-containing compounds, or a combination of at least two selected therefrom. The iron-containing compound is any one selected from the group consisting of halogen compounds of iron, iron cyanides and iron-containing salts of acid, or a combination of at least two selected therefrom. The cobalt-containing compound is any one selected from the group consisting of halogen compounds of cobalt and cobalt-containing salts of acid, or a combination of at least two selected therefrom. The nickel-containing compound is any one selected from the group consisting of nickel chlorides and nickel-containing salts of acid, or a combination of at least two selected therefrom. Further preferably, the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

Preferably, the stirring and catalyzing in step (1) is carried out at 150-200° C. for 4 h or more, preferably 4 h-14 h; the water content in the precursor is preferably 10 wt % or less. The precursor in step (2) is heated to 280-350° C. at a rate of 3-5° C./min. The protective atmosphere is any one selected from the group consisting of nitrogen, helium and argon, or a combination of at least two selected therefrom, preferably nitrogen. The crude product in step (3) is acid washed and water washed in sequence. The acid washing is carried out by using hydrochloric acid having a concentration of 3 wt %-6 wt %, further preferably 5 wt %; the water washing is carried out by using deionized water and/or distilled water. The washing is carried out at 55-65° C., preferably 60° C.

The preparation steps above of the present invention may also preferably comprise:

first mixing a biomass carbon source with a catalyst, stirring, catalyzing and drying to obtain a precursor;

then maintaining the temperature of the precursor at 140-180° C. for 1.5 h-2.5 h under protective atmosphere to obtain a first intermediate; in some specific examples of the present invention, the temperature is selected from 142° C., 148° C., 155° C., 1600° C., 172° C. or 178° C., and maintained for 1.6 h, 1.8 h, 2 h, 2.2 h or 2.4 h.

Then heating by temperature programming to 350-450° C. and maintaining the temperature for 3 h-4 h to obtain a second intermediate; in some specific examples of the present invention, the temperature is selected from 360° C., 370° C., 380° C., 390° C., 410° C., 420° C., 430° C. or 440° C., and maintained for 3.1 h, 3.3 h, 3.5 h, 3.8 h or 3.9 h.

Then heating to 1100-1300° C. and maintaining the temperature for 2 h-4 h to obtain a third intermediate, i.e. a crude product; in some specific examples of the present invention, the temperature is selected from 1130° C., 1170° C., 1210° C. or 1280° C., and maintained for 2.2 h, 2.4 h, 2.6 h, 2.8 h, 3.0 h, 3.2 h, 3.4 h, 3.6 h or 3.8 h.

The temperature is increased by temperature programming at a rate of 14° C./min-18° C./min; in some specific examples of the present invention, the temperature increasing rate is 15° C./min, 16° C./min or 17° C./min.

Finally alkali washing, acid washing and water washing the third intermediate (i.e. the crude product) to obtain the composite.

In the present invention, the biomass carbon source is preferably one or more selected from lignocellulose, cellulose and lignose, more preferably lignocellulose, cellulose or lignose.

In the present invention, the biomass carbon source and catalyst have a mass ratio of 1:(0.5-5), preferably 1:(1-3); in some specific examples of the present invention, the ratio is 1:0.5, 1:1 or 1:3.

In the present invention, the catalyst is any one selected from the group consisting of halogen compounds of manganese, iron-containing compounds, cobalt-containing compounds, and nickel-containing compounds, or a combination of at least two selected therefrom.

Preferably, the iron-containing compound is any one selected from the group consisting of halogen compounds of iron, iron cyanides and iron-containing salts of acid, or a combination of at least two selected therefrom. The iron-containing salts of acid are organic acid salts containing iron element or inorganic acid salts containing iron element. The halogen compounds of iron may be ferric chloride and/or ferric bromide.

Preferably, the cobalt-containing compound is any one selected from the group consisting of halogen compounds of cobalt and cobalt-containing salts of acid, or a combination of at least two selected therefrom. The cobalt-containing salts of acid are organic acid salts containing cobalt element or inorganic acid salts containing cobalt element. The halogen compounds of cobalt may be cobalt chloride and/or cobalt bromide.

Preferably, the nickel-containing compound is any one selected from the group consisting of nickel chlorate of and nickel-containing salts of acid, or a combination of at least two selected therefrom. The nickel-containing salts of acid are organic acid salts containing nickel element or inorganic acid salts containing nickel element. The halogen compounds of nickel may be nickel chloride and/or nickel bromide.

Preferably, the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

The typical but non-limitative examples of the catalyst combination of the present invention include a combination of ferrous chloride and ferric sulfate, a combination of potassium ferricyanide and potassium trioxalatoferrate, a combination of cobalt chloride, cobalt nitrate and ferric chloride, a combination of cobalt sulfate, cobalt acetate and nickel nitrate, and a combination of ferric chloride, cobalt chloride, and nickel acetate.

The stirring and catalyzing treatment is carried out at 150° C.-200° C., e.g. 160° C., 170° C., 180° C., 190° C. and the like, for 4 h or more, preferably 4 h-14 h. In some specific examples of the present invention, it lasts for 4.2 h, 7 h, 9 h, 12 h, 16 h, 19 h, and 23 h.

Preferably, the precursor contains water in an amount of 10 wt % or less. In some specific examples of the present invention, the water content is 1 wt %, 2 wt %, 3 wt %, 4 wt %, 5 wt %, 6 wt %, 7 wt %, 8 wt %, or 10 wt % and the like.

Preferably, the protective atmosphere is any one selected from the group consisting of nitrogen, helium and argon, or a combination of at least two selected therefrom, preferably nitrogen.

Preferably, the acid washing is carried out by using hydrochloric acid having a concentration of 3 wt %-6 wt %, further preferably 5 wt %; the water washing is preferably carried out by using deionized water and/or distilled water; the alkali washing is carried out by using an aqueous solution of sodium hydroxide having a concentration of 5 wt %-15 wt %, further preferably 10 wt %.

Preferably, the washing is carried out at 55-65° C., e.g. 56° C., 57° C., 58° C., 60° C., 63° C. and the like, preferably 60° C.

The biomass carbon source is cellulose and/or lignose, preferably cellulose, further preferably porous cellulose.

The porous cellulose of the present invention can be obtained according to the prior art. The typical but non-limitative prior art for obtaining porous cellulose includes, e.g. preparing porous cellulose according to the method disclosed in CN104016341A, and preparing cellulose according to the method disclosed in CN103898782A.

Preferably, the porous cellulose is obtained by the following method:
acid hydrolyzing a biomass source to obtain lignocellulose, then porous post-processing to obtain porous cellulose; optionally, the porous cellulose is used after bleaching.

The biomass carbon source is any one selected from the group consisting of plants and/or agricultural and forestry wastes, or a combination of at least two selected therefrom, preferably any one selected from agricultural and forestry wastes, or a combination of at least two selected therefrom.

Preferably, the agricultural and forestry wastes are selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The typical but non-limitative combination examples of the biomass source include a combination of corn stalks and corn cobs, a combination of bagasse, sorghum stalks and wood chips, a combination of sorghum bars, beet residues and xylose residue.

The composite prepared according to the aforesaid preparation process also falls with the circumstances comprising biomass graphene.

The composite having a carbon nanostructure of the present invention can also be prepared by the following various methods.

Method 2

Biomass source is used to obtain active carbon via current processes. Since the types and contents of microelements within different plants are greatly different, later steps such as acid washing and water washing are used to control the content of the non-carbon non-oxygen non-hydrogen element. Graphene is introduced on such a basis to make the content of the non-carbon non-oxygen non-hydrogen element be 0.3 wt %-5 wt % of the composite.

Method 3

Commercially available lignose is high-temperature carbonized under inert gas, or graphitization reaction is not thoroughly carried out. Then graphene is added. A combination of any three or more selected from the group consisting of nano-P, Si, Ca, Al, Na, Fe, Ni, Mn, K, Mg, Cr, S or Co (at least comprising Fe, Si and Al) is introduced, and the content thereof is controlled to be 0.3 wt %-5 wt %.

Method 4

Some organic wastes such as phenolic resin cystosepiment are carbonized. Then graphene is added. A combination of any three or more selected from the group consisting of nano-P, Si, Ca, Al, Na, Fe, Ni, Mn, K, Mg, Cr, S or Co (at least comprising Fe, Si and Al) is introduced, and the content thereof is controlled to be 0.3 wt %-5 wt %.

Method 5

Active carbon and graphene are added into nano-graphite. A combination of any three or more selected from the group consisting of nano-P, Si, Ca, Al, Na, Fe, Ni, Mn, K, Mg, Cr, S or Co (at least comprising Fe, Si and Al) is introduced, and the content thereof is controlled to be 0.3 wt %-5 wt %.

The composite having a carbon nanostructure of the present invention is not limited by the preparation processes listed above. The products of the composite having a carbon nanostructure of the present invention are obtained by the aforesaid methods. The far-infrared and antibacterial performances of those obtained by Method 1 are superior to those obtained by Methods 2-5. However, homogeneous dispersion can be made without any activation or modification when down-stream products are prepared, which plays a certain effect.

The present invention discloses introducing graphene structure and a substance containing elements of Fe, Si and Al by incorporating a composite having a carbon nanostructure, without any pretreatment of the substances to be introduced, such as activation, modification, etc., to achieve effective combination with polyurethane foam for additional enhanced far-infrared effect and antimicrobial effect.

The content of the non-carbon non-oxygen non-hydrogen element of the present invention can be tested by the composite having a carbon nanostructure of the present invention prepared as described above, specifically:

First method for determining the non-carbon non-oxygen non-hydrogen element content:

Decomposing the composite having a carbon nanostructure with nitric acid ($\rho=1.42$ g/mL), perchloric acid ($\rho=1.67$ g/mL) and hydrofluoric acid ($\rho=1.16$ g/mL), maintaining the temperature in nitric acid medium, determining the volume, quantitatively analyzing with inductively coupled plasma atomic emission spectrometry using standard curve method the content of P, Si, Ca, Al, Na and the like in the composite having a carbon nanostructure.

Second method for determining the non-carbon non-oxygen non-hydrogen element content:

Using the National Standard GB/T17359-1998: General specification of X-ray EDS quantitative analysis for EPMA and SEM.

The present invention does not define the method for determining the non-carbon non-oxygen non-hydrogen element, and any of the methods known in the art or new determining method can be used in the present invention. The present invention provides two methods for determining the content of the non-carbon non-oxygen non-hydrogen element, preferably "first method for determining the non-carbon non-oxygen non-hydrogen element content". The present invention uses the "first method for determining the non-carbon non-oxygen non-hydrogen element content" in the examples.

Infrared detection data of the composite having a carbon nanostructure were based on GBT 7286.1-1987 Test method for total normal emittance of metals and nonmetallic materials.

Antibacterial test data of the composite having a carbon nanostructure were based on the test method according to GB/T 20944.3-2008, taking Staphylococcus aureus as examples.

The present invention provides a process for preparing a polyurethane foam comprising graphene structure, comprising the steps of:

introducing a substance containing graphene structure and non-carbon non-oxygen non-hydrogen element into polyether polyol to prepare a polyurethane foam comprising a carbon nanostructure.

The graphene structure of the present invention is preferably introduced in a form of a mixture which preferably comprises a non-graphene-structure component, such as amorphous carbon component.

The present invention provides a product comprising a polyurethane foam stated in any of the aforesaid technical solutions, or prepared according to the preparation process stated in any of the aforesaid technical solutions. The product is preferably selected from the group consisting of pillow, mattress, cushion, back cushion, sofa, waist support, insoles, bra, car seat, toilet seat, or hand warmer.

The present invention provides a polyurethane foam and its preparing process and application products. Due to the introduction of the graphene structure and the non-carbon non-oxygen non-hydrogen element into traditional polyurethane foam, and the combination of the graphene structure with elements of Fe, Si and Al, the polyurethane foam provided by the present invention has a variety of properties, such as far-infrared property and antibacterial and bacteriostatic properties, and can have higher far-infrared effect and bacteriostatic effect by controlling specific addition ratio. In addition, the present invention discloses introducing a substance containing graphene structure and non-carbon non-oxygen non-hydrogen element by incorporating a composite having a carbon nanostructure, without any pretreatment of the substance to be introduced, such as activation, modification, etc., to achieve effective combination with polyurethane foam for additional enhanced far-infrared effect and bacteriostatic effect.

The present invention detects the far-infrared performance and antibacterial property of the polyurethane foam according to the following testing standards.

Infrared detection data of the composite having a carbon nanostructure were based on GBT 7286.1-1987 Test method for total normal emittance of metals and nonmetallic materials.

Antibacterial test data of the composite having a carbon nanostructure were based on GB/T 31402-2015 Plastics-Measurement of antibacterial activity on plastics surfaces, taking Staphylococcus aureus as examples.

Test results show that the polyurethane foam of the present invention has a far-infrared performance of as high as 0.93 and an antibacterial performance of as high as 99%.

In order to further explain the present invention, the polyurethane foam, process for preparing the same and application thereof are detailed disclosed in combination with the examples. The protection scope of the present invention is not limited by the following examples.

EXAMPLE 1

A composite having a carbon nanostructure was obtained by the following method:
(1) mixing corncob cellulose and ferrous chloride in a mass ratio of 1:1, stirring at 150° C. and catalyzing for 4 h, drying to a water content of 10 wt %, to obtain a precursor;
(2) heating the precursor to 170° C. at an increasing rate of 3° C./min under protective atmosphere, and maintaining the temperature for 2 h, then heating by temperature programming to 400° C. at an increasing rate of 15° C./min, maintaining the temperature for 3 h and then heating to 1200° C. to obtain a crude product;
(3) washing the crude product with sodium hydroxide solution having a concentration of 10 wt % and acid washing with hydrochloric acid having a concentration of 4 wt % at 55-65° C. and water washing to obtain a composite having a carbon nanostructure.

The composite having a carbon nanostructure in Example 1 was determined with Raman spectrum, and the results showed that the G peak and D peak had a peak height ratio of 3.

It was determined by the "first method for determining the non-carbon non-oxygen non-hydrogen element content" that the composite having a carbon nanostructure primarily comprised elements of P, Si, Ca, Al, Fe, and Mg.

EXAMPLE 2

Corncob cellulose in Example 1 was replaced with reed cellulose.

The composite having a carbon nanostructure in Example 2 was determined with Raman spectrum, and the results showed that the G peak and D peak had a peak height ratio of 4.8.

It was determined by the "first method for determining the non-carbon non-oxygen non-hydrogen element content" that the composite having a carbon nanostructure primarily comprised elements of Si, Ca, Al, Fe, Mg and S.

EXAMPLE 3

Corncob cellulose in Example 1 was replaced with poplar cellulose.

The composite having a carbon nanostructure in Example 3 was determined with Raman spectrum, and the results showed that the G peak and D peak had a peak height ratio of 4.6.

It was determined by the "first method for determining the non-carbon non-oxygen non-hydrogen element content" that the composite having a carbon nanostructure primarily comprised elements of P, Si, Al, Na, Fe and Ni.

EXAMPLE 4

Corncob cellulose in Example 1 was replaced with corncob lignose.

The composite having a carbon nanostructure in Example 4 was determined with Raman spectrum, and the results showed that the G peak and D peak had a peak height ratio of 2.8.

It was determined by the "first method for determining the non-carbon non-oxygen non-hydrogen element content" that the composite having a carbon nanostructure primarily comprised elements of P, Si, Ca, Al, Na, Fe, Mg, Fe, Mg and K.

EXAMPLE 5

Adding corn cob spare material into 44% zinc chloride solution (adjusted to pH=1 with hydrochloric acid) in a 3 times amount, thoroughly stirring and impregnating, standing and absorbing for 5 h, then thoroughly stirring, standing and absorbing for 5 h till zinc chloride solution was completely absorbed, moving into an open flat carbonization furnace for sealed carbonization at 400° C. for 3 h, thoroughly stirring every 30 minutes or so, dropping the furnace temperature to below 100° C. before stirring, heating to sealed carbonization till black coke was formed, discharging and cooling, impregnating with 44% zinc chloride solution (adjusted to pH=1 with hydrochloric acid) in a 2 times amount, fully stirring, so that zinc chloride solution was completely absorbed, moving into an activation furnace, activating at 650° C. for 70 minutes, discharging and cooling, transferring into a wooden barrel, adding 40% ammonium chloride solution in the same amount, thoroughly stirring and washing, standing and clarifying, siphoning out clear liquid, stirring and washing with 30%, 12% and 3% ammonium chloride solution in sequence, then stirring and washing with 30% hydrochloric acid in the same amount, filtering out carbon particles, moving into a pot, adding water in the same volume, boiling and washing till there was no ammonium chloride, heating and evaporating, stirring and stir-frying, discarding moisture, drying and pulverizing, filtering with a 120-mesh sieve to obtain an activate carbon.

On such a basis, graphene was introduced, and nanomaterials containing P, Si, Ca, Al, Fe and Mg were added, specifically nano-phosphorus pentoxide, nano-silicon powder, nano-calcium carbonate, nano-aluminum oxide, nano-iron and nano-magnesium powder.

EXAMPLE 6

Sealing and carbonizing lignose in a carbonization furnace at 400° C. for 3 h, thoroughly stirring once every 30 min, lowering the furnace temperature to below 100° C. before stirring, heating to 2200° C. under argon conditions after stirring, sealing and graphitizing for 2 h, discharging and cooling, stirring and washing with ammonium chloride solution having a concentration of 30%, 12% and 3%, stirring and washing with hydrochloric acid having a concentration of 30% in an equivalent amount, drying, pulverizing and filtering with a 120-mesh sieve to obtain a mixed carbon material of graphite and active carbon.

On such a basis, graphene was introduced, and nano-materials containing P, Si, Ca, Al, Fe and Mg were added, specifically nano-phosphorus pentoxide, nano-silicon dioxide, nano-calcium carbonate, nano-aluminum powder, nano-iron and nano-magnesium carbonate.

EXAMPLE 7

Phenolic resin foam plate was used to carbonize at 330° C. to remove oxyhydrogen elements firstly, then to carbonize at a high temperature of 700° C. On such a basis, graphene was introduced, and nano-materials containing P, Si, Ca, Al, Fe and Mg were added.

EXAMPLE 8

Into nano-graphite were added active carbon and graphene. Nano-materials containing P, Si, Ca, Al, Fe and Mg were added, specifically nano-phosphorus pentoxide, nano-silicon powder, nano-aluminum powder, nano-iron and nano-magnesium powder.

COMPARISON EXAMPLE 1

Graphene obtained in Example 7 of CN104016341A disclosing a process for preparing porous graphene was used as Comparison Example 1. Graphene prepared in the comparison example was determined with Raman spectrum, and the results showed that the G peak and D peak had a peak height ratio of 13. It was determined by the "first method for determining the non-carbon non-oxygen non-hydrogen element content" that the composite having a carbon nanostructure primarily comprised elements of P, Si, Ca, Al, Na, Fe, Mg and K.

COMPARISON EXAMPLE 2

A phosphorus-doped graphene was prepared according to the process disclosed in CN103508444A, specifically comprising:
   adding 1 g of graphite having a purity of 95% into 24 mL of concentrated nitric acid having a mass percent of 65%, and then mixing with 90 mL concentrated sulfuric acid having a mass percent of 98%, stirring the mixture under the environment of ice water mixed bath for 20 min, adding potassium hypermanganate slowly into the mixture, wherein potassium hypermanganate and graphite had a mass ratio of 5:1, stirring for 1 h, heating the mixture to 85° C. and maintaining for 30 min, then adding deionized water, and then maintaining at 85° C. for 30 min, wherein the deionized water and graphite had a liquid-solid ratio of 90 mL:1 g, finally adding hydrogen peroxide solution having a mass percent of 30%, wherein hydrogen peroxide solution and graphite had a liquid-solid ratio of 10 mL:1 g, stirring for 10 min, pump filtering the mixture, then washing the solid with diluted hydrochloric acid and deionized water in sequence, wherein the diluted hydrochloric acid, deionized water and graphite had a liquid-solid ratio of 100 mL:150 mL:1 g, washing for three times, finally drying the solid substance in an vacuum oven at 60° C. for 12 h to obtain a graphite oxide; homogeneously mixing the graphite oxide and phosphorous pentoxide in a mass ratio of 1:2, placing in an argon atmosphere having a flow rate of 300 mL/min, heating to 900° C. in an increasing rate of 15° C./min, maintaining for 2 h, then decreasing the temperature to room temperature in an argon atmosphere having a flow rate of 300 mL/min to obtain a phosphorus-doped graphene.

Nitrogen-doped graphene prepared in Comparison Example 2 was determined with Raman spectrum, and the results showed that the G peak and D peak had a peak height ratio of 5.

It was determined by the "first method for determining the non-carbon non-oxygen non-hydrogen element content" that the composite having a carbon nanostructure primarily comprised P.

COMPARISON EXAMPLE 3

Parallel Comparison Experimental Example

Active carbon containing graphene, comprising elements of P, Si, Ca, Fe, Mg and Mn, was prepared by using Example 1 in CN104118874A disclosing an active carbon/graphene complex and a process for preparing the same.

COMPARISON EXAMPLE 4

Parallel Comparison Experimental Example
Commercially available graphene.

COMPARISON EXAMPLE 5

Parallel Comparison Experimental Example
Commercially available bamboo charcoal powder.
Polyurethane foams having a carbon nanostructure were prepared by using Examples 1-8 and Comparison Examples 1-3.

Polyurethane foams having a carbon nanostructure were prepared by using commercially available graphene in Comparison Example 4 and commercially available bamboo charcoal powder in Comparison Example 5.

Taking preparing polyurethane foam pillow as the example, 100 parts of polyether polyol, 50 parts of polyisocyanate, 4 parts of a composite having a carbon nanostructure, 1 part of a first catalyst, 1 part of an emulsifier and 4 parts of a foaming agent were used; the curing temperature was 50° C.; the curing lasted for 10 min.

Into polyether polyol was added the composite having a carbon nanostructure in Examples 1-8 or Comparison Examples 1-3, commercially available bamboo charcoal powder, or commercially available graphene in Comparison Example 5, then mixed with the emulsifier, first catalyst and foaming agent, stirred and homogeneously mixed to obtain a polyether polyol monomer composition. Then into the composition was added polyisocyanate and homogeneously mixed. Finally, the mixture was poured into a pillow mold for foaming and curing to obtain a polyurethane foam pillow.

In the raw materials used in step (3) involved in the examples and comparison examples of the present invention, it was disclosed that polyether polyol was triol polyether and trihydroxymethylpropane polyether in a mass ratio of 7:3; polyisocyanate was toluene diisocyanate (TDI); the first catalyst was triethylenediamine and stannous octoate in a mass ratio of 4:1; the emulsifier was methylphenyl silicone oil; and the foaming agent was water, to illustrate the effect of the addition of the composite having a carbon nanostructure on the performance of the polyurethane foam. However, those skilled in the art should know that polyether polyol, polyisocyanate, first catalyst, emulsifier and foaming agent all could be selected according to the current technological conditions of the polyurethane foam.

The far-infrared performance and antibacterial property of the polyurethane foam pillow were detected according to the following testing standards.

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking Staphylococcus aureus as examples.

In the raw materials used in step (3) involved in the examples and comparison examples of the present invention, it was disclosed that polyether polyol was triol polyether and trihydroxymethylpropane polyether in a mass ratio of 7:3; polyisocyanate was toluene diisocyanate (TDI); the first catalyst was triethylenediamine and stannous octoate in a mass ratio of 4:1; the emulsifier was methylphenyl silicone oil; and the foaming agent was water, to illustrate the effect of the addition of the composite having a carbon nanostructure on the performance of the polyurethane foam. However, those skilled in the art should know that polyether polyol, polyisocyanate, first catalyst, emulsifier and foaming agent all could be selected according to the current technological conditions of the polyurethane foam.

The far-infrared performance and antibacterial property of the polyurethane foam pillow were detected according to the following testing standards.

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking Staphylococcus aureus as examples.

Test Results

When the addition amount was 1 wt %, polyurethane foam pillows were prepared.

Performance test results in the examples and comparison examples are shown in Table 1.

TABLE 1

Performance test results in the examples and comparison examples

| Examples | Sum of the contents of Fe, Si and Al in the polyurethane foam pillow, % | Far-infrared (Normal emissivity) | Antibacterial rate, % |
|---|---|---|---|
| Example 1 | 0.045 | 0.88 | 90 |
| Example 2 | 0.025 | 0.83 | 91 |
| Example 3 | 0.03 | 0.84 | 92 |
| Example 4 | 0.05 | 0.86 | 80 |
| Example 5 | 0.025 | 0.82 | 76 |
| Example 6 | 0.03 | 0.81 | 84 |
| Example 7 | 0.045 | 0.81 | 85 |
| Example 8 | 0.03 | 0.80 | 84 |
| Comparison Example 1 | 0.01 | 0.77 | 46 |
| Comparison Example 2 | 0.12 | 0.76 | 45 |
| Comparison Example 3 | 0.05 | 0.74 | 80 |
| Comparison Example 4 | 0.002 | 0.73 | 48 |
| Comparison Example 5 | 0.03 | 0.72 | 8 |

When the addition amount was 3 wt %, polyurethane foam pillows were prepared.

Performance test results in the examples and comparison examples are shown in Table 2.

TABLE 2

Performance test results in the examples and comparison examples

| Examples | Sum of the contents of Fe, Si and Al in the polyurethane foam pillow, % | Far-infrared (Normal emissivity) | Antibacterial rate, % |
|---|---|---|---|
| Example 1 | 0.13 | 0.92 | 95 |
| Example 2 | 0.09 | 0.86 | 96 |
| Example 3 | 0.12 | 0.88 | 96 |
| Example 4 | 0.14 | 0.89 | 97 |
| Example 5 | 0.09 | 0.81 | 67 |
| Example 6 | 0.08 | 0.82 | 68 |
| Example 7 | 0.11 | 0.83 | 69 |
| Example 8 | 0.12 | 0.84 | 75 |
| Comparison Example 1 | 0.02 | 0.77 | 46 |
| Comparison Example 2 | 0.22 | 0.75 | 45 |
| Comparison Example 3 | 0.5 | 0.70 | 55 |
| Comparison Example 4 | 0.018 | 0.70 | 53 |
| Comparison Example 5 | 0.08 | 0.70 | 8 |

When the addition amount was 5 wt %, polyurethane foam pillows were prepared.

Performance test results in the examples and comparison examples are shown in Table 3.

TABLE 3

Performance test results in the examples and comparison examples

| Examples | Sum of the contents of Fe, Si and Al in the polyurethane foam pillow, % | Far-infrared (Normal emissivity) | Antibacterial rate, % |
|---|---|---|---|
| Example 1 | 0.22 | 0.93 | 99 |
| Example 2 | 0.20 | 0.87 | 96 |
| Example 3 | 0.23 | 0.89 | 96 |
| Example 4 | 0.24 | 0.89 | 97 |
| Example 5 | 0.18 | 0.82 | 70 |
| Example 6 | 0.20 | 0.83 | 68 |
| Example 7 | 0.17 | 0.83 | 71 |
| Example 8 | 0.16 | 0.84 | 68 |
| Comparison Example 1 | 0.02 | 0.73 | 52 |
| Comparison Example 2 | 0.54 | 0.74 | 55 |
| Comparison Example 3 | 0.81 | 0.71 | 52 |
| Comparison Example 4 | 0.063 | 0.71 | 60 |
| Comparison Example 5 | 0.14 | 0.72 | 8 |

When the addition amount was 10 wt %, polyurethane foam pillows were prepared.

Performance test results in the examples and comparison examples are shown in Table 4.

TABLE 4

Performance test results in the examples and comparison examples

| Examples | Sum of the contents of Fe, Si and Al in the polyurethane foam pillow, % | Far-infrared (Normal emissivity) | Antibacterial rate, % |
|---|---|---|---|
| Example 1 | 0.38 | 0.88 | 99 |
| Example 2 | 0.31 | 0.83 | 96 |
| Example 3 | 0.32 | 0.84 | 96 |
| Example 4 | 0.39 | 0.86 | 97 |
| Example 5 | 0.24 | 0.82 | 70 |
| Example 6 | 0.23 | 0.81 | 74 |

TABLE 4-continued

Performance test results in the examples and comparison examples

| Examples | Sum of the contents of Fe, Si and Al in the polyurethane foam pillow, % | Far-infrared (Normal emissivity) | Antibacterial rate, % |
|---|---|---|---|
| Example 7 | 0.24 | 0.81 | 73 |
| Example 8 | 0.25 | 0.80 | 79 |
| Comparison Example 1 | 0.05 | 0.77 | 57 |
| Comparison Example 2 | 0.71 | 0.78 | 60 |
| Comparison Example 3 | 1.1 | 0.72 | 32 |
| Comparison Example 4 | 0.063 | 0.72 | 68 |
| Comparison Example 5 | 0.29 | 0.74 | 12 |

After graphene structure and non-carbon non-oxygen non-hydrogen element, such as elements of Fe, Si and Al, are introduced during the preparation process of polyurethane foams, a series of subsequent steps are required. Thus, the content of the non-carbon non-oxygen non-hydrogen element, such as elements of Fe, Si and Al, is not correspondingly proportional to the carrier or mixture or composite for introducing such substance. For example, graphene structure and non-carbon non-oxygen non-hydrogen element are introduced in a form of a composite having a carbon nanostructure. When the composite having a carbon nanostructure is added in an amount of 1 wt % of the polyurethane foam, the content of elements of Fe, Si and Al is in an amount of 0.2 wt % of the polyurethane foam pillow. When the composite having a carbon nanostructure is added in an amount of 3 wt % of the polyurethane foam, the content of elements of Fe, Si and Al is in an amount of 0.5 wt % of the polyurethane foam pillow. Therefore, the types and contents of the graphene structure and non-carbon non-oxygen non-hydrogen element in the polyurethane foam play a key role in the far-infrared performance and antibacterial properties of the polyurethane foam.

It can be seen from the above examples and comparison examples that there are many microelements in the plant itself. If the substances containing the graphene structure and the microelements can be directly prepared by the plant itself, each component in the product will be more homogeneously dispersed, e.g. microelements, and the effects to be achieved during the combination with substances such as macromolecular materials will be more excellent. By late introduction of microelements, the mixing will be more homogeneous, and the effect will be more obvious. Moreover, the effect is a little bit worse than the effect by natural mixing.

COMPARISON EXAMPLES 6-8

Nano-carbon black, nano-flaky graphite and purchased graphene were used to produce polyurethane foam pillows, in which nano-carbon black, nano-flaky graphite and purchased graphene were respectively in an amount of 1 wt % of the polyurethane foam pillow.

The resulting polyurethane foam pillows in Example 1 and Comparison

Examples 4-6 were subjected to temperature rise measurements, and the results are as follows.

Basic test conditions:
Room temperature: 17° C.;
Humidity: 85%;
Height of the infrared light from the desktop: 51 cm
Infrared lamp model: PHLIPS
The specific results can be referred to FIG. 1 and Table 5.

TABLE 5

Temperature rise data of different types of graphene pillows

| | 0 s | 10 s | 20 s | 30 s | 40 s | 50 s | 60 s | 90 s | 120 s | 150 s | 180 s |
|---|---|---|---|---|---|---|---|---|---|---|---|
| Blank sample | 14.0 | 23.5 | 27.6 | 30.9 | 33.9 | 35.9 | 37.7 | 42.8 | 45.1 | 46.7 | 47.9 |
| Example 1 | 13.8 | 50.3 | 64.5 | 73.7 | 81.3 | 86.8 | 89.2 | 98.1 | 104 | 107.1 | 108.8 |
| Comparison Example 6 | 15.7 | 14.9 | 47.1 | 67.5 | 71.9 | 74.5 | 77.3 | 84.8 | 92.3 | 95.6 | 99 |
| Comparison Example 7 | 15 | 44.1 | 57.8 | 65.5 | 69.8 | 76.3 | 80.2 | 91.5 | 96.1 | 95.6 | 98.7 |
| Comparison Example 8 | 14 | 38.7 | 41.5 | 56.7 | 61 | 66.8 | 67.7 | 74.1 | 80.1 | 82.3 | 88.7 |

Figure 1:
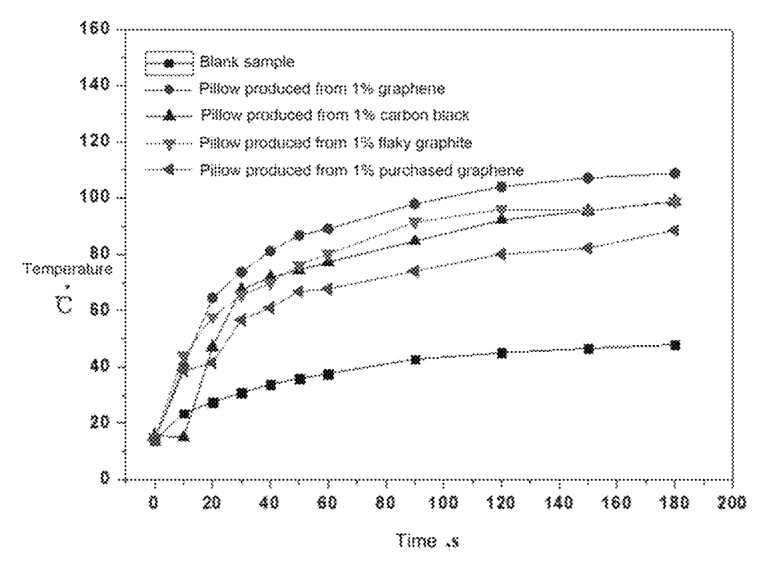
FIG. 1 shows a temperature-time curve of different types of graphene pillows in Example 1 and Comparison Examples 6-8.

It can be seen that the polyurethane foam pillow prepared using the material prepared in Example 1 of the present invention has the best temperature rise effect as compared to Comparison Examples 6-8.

Basic steps in Examples 9-15

A process for preparing a polyurethane foam comprises the steps of (1) Referring to CN104016341A, Preparation of porous cellulose, specifically:

adjusting an aqueous solution of corn cobs to pH=3 with sulfuric acid at 90° C., immersing for 10 minutes for hydrolysis to obtain lignocellulose, wherein the sulfuric acid was in an amount of 3% of the corn cob mass; and then soaking the obtained lignocellulose in acidic sulphite at 70° C. for 1 h to obtain porous cellulose for backup, wherein the acid is sulfuric acid; the sulphite is magnesium sulfite; the sulfuric acid is in an amount of 4% of the lignocellulose mass; the liquid to solid ratio is 2:1.

(2) Preparation of the composition having a carbon nanostructure, specifically:

mixing the porous cellulose with a second catalyst in a mass ratio 1:(0.1-10), stirring at 150-200° C. and catalyzing for 4 h or more, drying to the moisture content of a precursor of 10 wt % or less to obtain a precursor, then heating to 280-350° C. at a rate of 3-5° C./min under protective atmosphere, and maintaining for 1.5 h-2.5 h, then heating by temperature programming to 950° C.-1200° C. at a rate of 15-20° C./min, maintaining for 3 h-4 h to obtain a crude product, acid washing the crude product at 55-65° C. with hydrochloric acid, water washing to obtain the composite having a carbon nanostructure.

The composite having a carbon nanostructure was subject to Raman spectrum determination and element determination.

(3) Compounding of polyurethane, specifically:

adding the composite having a carbon nanostructure of step (2), an emulsifier, a first catalyst and a foaming agent to polyether polyol, stirring and mixing uniformly to obtain a polyether polyol monomer composition, then adding polyisocyanate into the polyether polyol monomer composition, homogeneously mixing, and finally pouring the mixture into a mold for foaming and curing to obtain a polyurethane foam comprising the composite having a carbon nanostructure.

Example 9 provides a process for preparing a composite polyurethane foam, and there are the following changes for the specific conditions on the basis of the basic steps in Examples 9-15:

in step (2), the second catalyst was ferrous chloride; the porous cellulose and the second catalyst were mixed in a mass ratio of 1:0.1; the catalytic treatment was carried out at 150° C. for 4 h; the water content of the precursor was 10 wt %;

the process for obtaining the crude product comprised heating to 280° C. at a rate of 3° C./min, maintaining the temperature for 2 h, then heating to 950° C. at a rate of 15° C./min and maintaining for 3 h;

acid washing at 55° C. with hydrochloric acid having a concentration of 4 wt %.

the composite having a carbon nanostructure obtained in step (2) primarily comprised elements of P, Si, Ca, Al, Na, Fe and Mg, and the Raman spectrum showed a peak height ratio of the G peak to D peak of 7, there was a 2D peak;

in step (3), the materials used therein comprised the following components, in parts by weight,

| polyether polyol | 100 parts |
| polyisocyanate | 50 parts |
| composite having a carbon nanostructure | 4 parts |
| first catalyst | 1 part |
| emulsifier | 1 part |
| foaming agent | 4 parts |

The curing was carried out at 50° C. for 10 min.

Example 10 provides a process for preparing a composite polyurethane foam, and the specific conditions therein were different from those in Example 9 only in that the composite having a carbon nanostructure in the used raw materials was added in an amount of 0.1 parts by weight in step (3).

Example 11 provides a process for preparing a composite polyurethane foam, and the specific conditions therein were different from those in Example 9 only in that the composite having a carbon nanostructure in the used raw materials was added in an amount of 10 parts by weight in step (3).

Example 12 provides a process for preparing a composite polyurethane foam, and the specific conditions therein were different from those in Example 9 only in that the porous cellulose and ferrous chloride had a changed ratio of 1:10 in step (2); the composite having a carbon nanostructure obtained therein primarily comprised elements of P, Si, Ca, Al, Na, Fe and Mg; and the Raman spectrum showed a peak height ratio of the G peak to D peak of 20.

Example 13 provides a process for preparing a composite polyurethane foam, and the specific conditions therein were different from those in Example 9 only in that the porous cellulose and ferrous chloride had a changed ratio of 1:0.5 in step (2); the composite having a carbon nanostructure obtained therein primarily comprised elements of P, Si, Ca, Al, Na, Fe and Mg; and the Raman spectrum showed a peak height ratio of the G peak to D peak of 1.5.

Example 14 provides a process for preparing a composite polyurethane foam, and the specific conditions therein were different from those in Example 9 only in that, in step (3), the materials used therein comprised the following components, in parts by weight,

| polyether polyol | 100 parts |
| polyisocyanate | 100 parts |
| composite having a carbon nanostructure | 5 parts |
| first catalyst | 4 parts |
| emulsifier | 5 parts |
| foaming agent | 20 parts. |

Example 15 provides a process for preparing a composite polyurethane foam, and the specific conditions therein were different from those in Example 9 only in that, in step (3), the materials used therein comprised the following components, in parts by weight,

| polyether polyol | 100 parts |
| polyisocyanate | 25 parts |
| composite having a carbon nanostructure | 5 parts |
| first catalyst | 0.1 parts |
| emulsifier | 0.1 parts |
| foaming agent | 0.1 parts |
| chain extender | 5 parts |
| cell-opening agent | 10 parts. |

Comparison Example 9 provides a process for preparing a composite polyurethane foam, and the specific conditions therein were different from those in Example 9 only in that, in step (3), the materials used therein comprised no composite having a carbon nanostructure.

Comparison Example 10 provides a process for preparing a composite polyurethane foam, and the specific conditions therein were different from those in Example 9 only in that, in step (3), the composite having a carbon nanostructure in the raw material used therein was added in an amount of 12 parts by weight.

Comparison Example 11 provides a process for preparing a composite polyurethane foam, and the specific conditions therein were different from those in Example 9 only in conducting no steps (1) and (2), replacing the composite having a carbon nanostructure prepared in step (3) with commercially available graphene, mixing with 0.3 parts by weight of phosphorus pentoxide, 0.3 parts by weight of silicon dioxide powder, 0.2 parts by weight of calcium chloride, 0.1 parts by weight of aluminum oxide, 0.1 parts by weight of sodium carbonate, 0.1 parts by weight of magnesium chloride and 0.1 parts by weight of ferrous chloride and adding into polyether polyol, introducing elements of P, Si, Ca, Al, Na, Fe and Mg, the Raman spectrum showed a peak height ratio of the G peak to D peak of 6.8.

In the raw materials used in step (3) involved in Examples 9-15 and Comparison Examples 9-11 of the present invention, triol polyether and trimethylolpropane polyether as polyether polyol in a mass ratio of 7:3, toluene diisocyanate (TDI) as polyisocyanate, triethylenediamine and stannous octoate in a mass ratio of 4:1 as the first catalyst, methylphenyl silicone oil as the emulsifier, and water as the foaming agent were taken as examples to illustrate the effect of the addition of the composite having a carbon nanostructure on the properties of the polyurethane foam. However, those skilled in the art should clearly know that polyether polyol, polyisocyanate, first catalyst, emulsifier, and foaming agent of the present invention could be selected according to the current technological conditions of polyurethane foams.

Performance Test

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking Staphylococcus aureus as examples.

Performance test results of the examples and comparison examples are shown in Table 1.

TABLE 1

Performance test results of Examples 9-15 and Comparison Examples 9-11

| Examples | Far-infrared (Normal emissivity) | Antibacterial rate |
|---|---|---|
| Example 9 | 0.92 | 98 |
| Example 10 | 0.85 | 30 |
| Example 11 | 0.93 | 99 |
| Example 12 | 0.92 | 99 |
| Example 13 | 0.90 | 97 |
| Example 14 | 0.92 | 97 |
| Example 15 | 0.92 | 97 |
| Comparison Example 9 | 0.75 | 0 |
| Comparison Example 10 | 0.85 | 80 |
| Comparison Example 11 | 0.88 | 90 |

The applicant declares that the present invention discloses the technological process of the present invention via the aforesaid examples. However, the present invention is not limited by the aforesaid detailed technological process. That is to say, it does not mean that the present invention cannot be carried out unless the aforesaid detailed technological process is carried out. Those skilled in the art shall know that any improvement, equivalent replacement of the parts of the present invention, addition of auxiliary parts, selection of specific modes and the like all fall within the protection scope and disclosure of the present invention.

The invention claimed is:

1. A process for preparing a polyurethane foam having a graphene structure and a non-carbon non-oxygen non-hydrogen element comprising elements of Fe, Si and Al, wherein the combined weight of the elements of Fe, Si and Al are in an amount of 0.0018 wt %-0.4 wt % of the polyurethane foam, the process comprising:
   (1) adding into a polyether polyol composition a composite having a carbon nanostructure, an emulsifier, a first catalyst, a foaming agent, and optionally a functional auxiliary, and stirring and mixing homogeneously to obtain a polyether polyol monomer composition;
   (2) adding polyisocyanate into the polyether polyol monomer composition of step (1) and mixing homogeneously to obtain a mixture; and
   (3) pouring the mixture in step (2) into a mold for foaming, and curing to obtain a polyurethane foam comprising the graphene structure;
   wherein the polyether polyol composition has a hydroxyl value of 20-300 mg KOH/g; and the polyether polyol composition is a mixture of a polyether having a hydroxyl value of 20-60 mg KOH/g and a polyether having a hydroxyl value of 150-300 mg KOH/g in a mass ratio of 1:(0.1-10).

2. The process of claim 1, wherein the composite having the carbon nanostructure in step (1) is added in an amount of 0.1-10 parts by weight relative to 100 parts by weight of the polyether polyol composition, the process further comprising:
   preparing the composite having the carbon nanostructure by:
      (i) mixing a biomass carbon source and a second catalyst, stirring, catalyzing, and drying to obtain a precursor;
      (ii) maintaining a temperature of the precursor under a protective atmosphere at 280° C.-350° C. for 1.5 hr-2.5 hr, then heating by temperature programming to 950° C.-1200° C. at a rate of 15-20° C./min, maintaining the temperature for 3 hr-4 hr to obtain a crude product; and
      (iii) washing the crude product to obtain a composite having a carbon nanostructure.

3. The process of claim 2, wherein:
   the biomass carbon source and second catalyst are provided in a mass ratio of 1:0.1-10;
   the biomass carbon source is cellulose and/or lignose;
   the second catalyst is any one selected from the group consisting of manganese compounds, iron-containing compounds, cobalt-containing compounds, and nickel-containing compounds, or a combination of at least two selected therefrom;
   the iron-containing compound is any one selected from the group consisting of compounds comprising iron and halogen, iron cyanides and iron-containing salts of acid, or a combination of at least two selected therefrom;
   the cobalt-containing compound is any one selected from the group consisting of compounds comprising cobalt and halogen and cobalt-containing salts of acid, or a combination of at least two selected therefrom; and
   the nickel-containing compound is any one selected from the group consisting of nickel chlorides and nickel-containing salts of acid, or a combination of at least two selected therefrom.

4. The process of claim 2, wherein:
   the stirring and catalyzing is carried out at 150° C.-200° C. for 4 hr or more;
   the precursor contains water in an amount of 10 wt % or less;
   the precursor in step (ii) is heated to 280° C.-350° C. at a rate of 3-5° C./min;
   the protective atmosphere is any one selected from the group consisting of nitrogen, helium and argon, or a combination of at least two selected therefrom; and
   the crude product in step (iii) is washed at 55-65° C. by acid washing and water washing in sequence, the acid washing carried out by using hydrochloric acid having a concentration of 3 wt %-6 wt %, and the water washing carried out by using deionized water and/or distilled water.

5. The process of claim 1, wherein
   the polyether polyols in the polyether polyol composition are selected from the group consisting of polyether diols, polyether triols, and a combination thereof;
   the polyisocyanate is any one selected from the group consisting of toluene diisocyanate, diphenylmethane diisocyanate, modified diphenylmethane diisocyanate and polymethylene polyphenyl polyisocyanate, or a combination of at least two selected therefrom;

the emulsifier includes one or more surfactants;

the foaming agent is any one selected from the group consisting of chemical foaming agent or physical foaming agent, the foaming agent added in an amount of 0.1-20 parts by weight per 100 parts by weight of the polyether polyol composition;

the first catalyst is any one selected from the group consisting of amine catalysts and/or metal salt catalysts, or a combination of at least two selected therefrom;

the amine catalysts are any one selected from the group consisting of triethylenediamine, triethylamine, cyclohexylamine and diethanolamine, or a combination of at least two selected therefrom;

the metal salt catalysts are any one selected from the group consisting of potassium acetate, potassium isooctanoate, potassium oleate, stannous octoate and dibutyltin dilaurate, or a combination of at least two selected therefrom; and the curing temperature in step (3) ranges from 20° C. to 60° C. and the curing lasts for 10-20 min.

6. The process of claim 1, wherein raw materials used in the process comprise the following components, in parts by weight:

| | |
|---|---|
| polyether polyol composition | 100 parts; |
| polyisocyanate | 25-100 parts; |
| composite having a carbon nanostructure | 0.1-10 parts; |
| first catalyst | 0.1-4 parts; |
| emulsifier | 0.1-5 parts; and |
| foaming agent | 0.1-20 parts. |

7. The process of claim 1, wherein the graphene structure and a substance containing the non-carbon non-oxygen non-hydrogen element are introduced in a form of the composite having the carbon nanostructure.

8. The process of claim 7, wherein the composite having the carbon nanostructure has a peak height ratio of the G peak to D peak of 1-20 in the Raman spectrum.

9. The process of claim 7, wherein the composite having the carbon nanostructure has a 2D peak in the Raman spectrum.

10. The process of claim 7, wherein the composite having the carbon nanostructure comprises carbon element in an amount of 80 wt % or more.

11. The process of claim 7, wherein the composite having the carbon nanostructure in the polyurethane foam is provided in an amount of 0.1 wt %-10 wt % of polyether polyol composition of the polyurethane foam.

12. The process of claim 7, wherein the composite having the carbon nanostructure has a far-infrared detection normal emissivity of greater than 0.85.

13. The process of claim 1, wherein the non-carbon non-oxygen non-hydrogen element further comprises any one selected from the group consisting of P, Ca and Na, or a combination of at least two selected therefrom.

14. The process of claim 1, wherein the non-carbon non-oxygen non-hydrogen element further comprises any one selected from the group consisting of Ni, Mn, K, Mg, Cr, S or Co, or a combination of at least two selected therefrom, the non-carbon non-oxygen non-hydrogen element other than elements of Fe, Si and Al is in an amount of 0.5 wt % or less of the polyurethane foam, and the elements of Fe, Si and Al are in an amount of 0.01 wt %-0.4 wt % of the polyurethane foam.

15. The process of claim 1, wherein the graphene structure is introduced in a form of biomass graphene prepared by using biomass as raw material, the graphene structure having a thickness less than or equal to 100 nm.

16. The process of claim 7, wherein the composite having the carbon nanostructure further includes:

a carbon six-membered ring honeycomb lamellar structure having a thickness of 100 nm or less; the carbon six-membered ring honeycomb lamellar structure in the composite microscopically showing any one conformation selected from the group consisting of warping, curling and folding, or a combination of at least two selected therefrom; and amorphous carbon, wherein the non-carbon non-oxygen non-hydrogen element is adsorbed on the surface of or inside the carbon nanostructure in any one form selected from the group consisting of simple substance, oxides and carbides, or a combination of more selected therefrom.

\* \* \* \* \*